May 12, 1964 JAMES E. WEBB 3,132,903
ADMINISTRATOR OF THE NATIONAL AERONAUTICS
AND SPACE ADMINISTRATION
SLIT REGULATED GAS JOURNAL BEARING
Filed Sept. 18, 1961
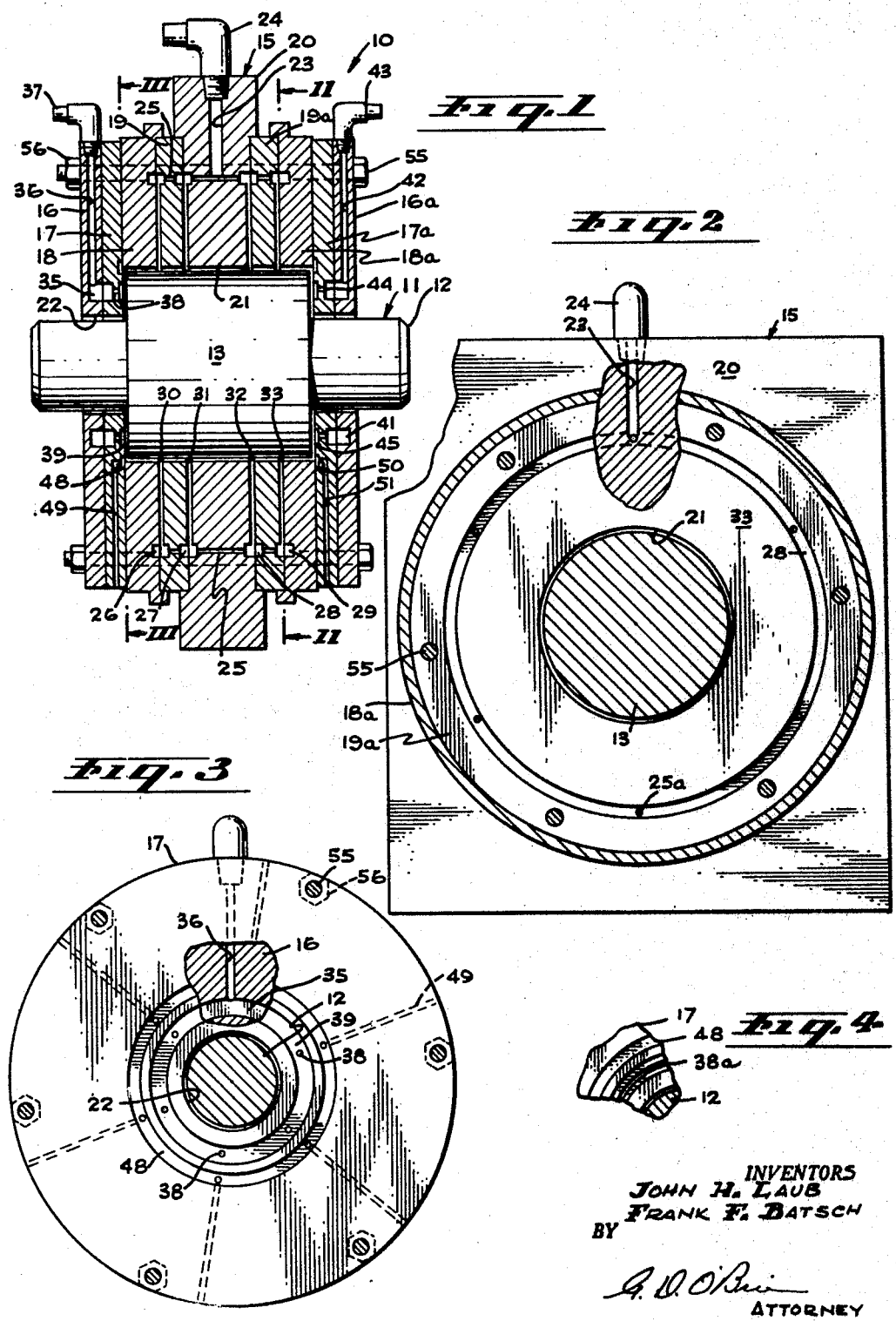
INVENTORS
JOHN H. LAUB
FRANK F. BATSCH
BY
ATTORNEY

United States Patent Office 3,132,903
Patented May 12, 1964

3,132,903
SLIT REGULATED GAS JOURNAL BEARING
James E. Webb, Administrator of the National Aeronautics and Space Administration, with respect to an invention of John H. Laub and Frank F. Batsch
Filed Sept. 18, 1961, Ser. No. 182,698
2 Claims. (Cl. 308—9)

This invention relates to a gas journal bearing, and more particularly to a slit regulated gas journal bearing.

Gas journal bearings are known to the prior art. One of the more successful types of gas journal bearings utilizes orifices for discharging fluid about the area of coaction between relatively movable bearing members. These orifices are normally located in the stationary bearing member and positioned circumferentially at equal spaced intervals. There may be several rows of these orifices arranged along the axis of rotation of the bearing members.

Several problems are inherent in gas journal bearings, the orifice type of bearing being more susceptible to these problems than the slit type bearing which forms the subject of the instant application. One such problem is that of turbine torque. With the orifice type bearing the radial alignment of the orifices must be precise to avoid portions of the fluid from acting tangentially thus creating turbine torque. Also, any eccentricity in one of the bearing members, primarily the rotor against which the fluid is directed from the orifices, results in increased turbine torque with the orifice type arrangement. The same reasoning applies when a load is applied to the rotor which causes the rotor to shift slightly resulting in an eccentric condition. This problem is alleviated by utilizing the slit arrangement of this invention. The slit provides means whereby the discharge of fluid is continuous circumferentially. The problem of directing the fluid radially is thus eliminated. The turbine torque developed due to eccentricity is also lessened.

It has been found that the stiffness factor of the slit type gas journal bearing is improved over that of the orifice type. Stiffness is a function of gap and load. Thus, with a given load applied in a particular direction the movable bearing member is displaced a smaller distance with respect to the stationary bearing member under similar conditions.

Fluid consumption for a gas type bearing is of particular importance in space vehicles. Storage facilities must be provided for the fluid or some system whereby the consumed gas may be recouped and again utilized. The slit regulated gas journal bearing of this invention has been found to consume less fluid than an orifice type bearing. The slit regulated gas journal bearing is easier to produce. With the orifice type it is difficult to align the orifices radially. It is also a problem to maintain proper hole size for each of the orifices as well as maintain precise circumferential spacing.

Regardless of the filter system utilized, certain foreign matter is always present in fluid. In the orifice type gas joural bearing foreign matter may lodge in one of the orifices greatly affecting the fluid distribution and further increasing the tendencies to develop turbine torque. Foreign matter in the fluid of a slit regulated gas journal bearing does not create the same problem since the fluid is emitted along a continuous circumferential line.

It is therefore an object of this invention to provide a slit regulated gas journal bearing which will reduce turbine torque.

Yet another object of this invention is to provide a slit regulated gas journal bearing which has a superior stiffness factor.

Still another object of this invention is to provide a slit regulated gas journal bearing which has a low gas consumption.

Another object of this invention is to provide a gas journal bearing which is easier to produce than existing gas journal bearings, resulting in a more competitive article of manufacture.

Yet another object of this invention is to provide a slit regulated gas journal bearing upon which foreign matter in the gas has a minimal effect.

These and other objects and advantages of this invention will become more apparent upon reading the specification in conjunction with the accompanying drawings.

In the drawings:

FIG. 1 is a cross sectional view of the slit regulated gas journal bearing taken along the axis of rotation of the bearing;

FIG. 2 is a cross sectional view taken along the section lines II—II of FIG. 1;

FIG. 3 is a cross sectional view taken along the section lines III—III of FIG. 1;

FIG. 4 is a segmental view taken along a section similar to FIG. 2, but showing the utilization of gas slits rather than orifices.

Basically, the slit regulated gas journal bearing consists of a stationary pillow block in which is journalled a rotor or rotating load supporting bearing member. The pillow block is constructed from a number of plates which are fixed together by tie bolts passing therethrough. The end plates or outside plates and the plates which abut the end plates have a shaft opening which receives the shaft of the rotor. The center plate and adjacent plates, which include plates abutting the center plate as well as plates intermediate the end plates and center plate, have a central bore which receives the body or drum of the rotor. The gas slits as well as the plenum chambers are formed in the plates before they are fixed together by the tie bolts. Manifolding is provided between the plenum chambers which supply fluid to the gas slits. An inlet passage is connected with the manifolding to supply fluid from the source. The gas slits discharge fluid onto the area of coaction between the pillow block and the rotor. The gas slits form continuous circumferential openings. Separate paths are provided for directing fluid against the ends of the enlarged portion of the rotor. Exhaust collector rings and discharge orifices are also provided at the ends of the enlarged section of the rotor.

Referring now more specifically to the details of the invention, FIG. 1 shows a cross section of the slit regulated gas journal bearing which is designated generally as 10.

The assembly 10 includes the rotor or movable bearing member generally designated 11. The rotor 11 has a cylindrical shaft 12 which is adapted to extend beyond the opposite sides of the assembly. The extending ends operate to receive the load application. The center of the shaft 12 is enlarged forming the rotor body or drum 13. The drum 13 is of considerable length and is in the form of a conventional right cylinder.

The stator or pillow block 15 is a stationary member and surrounds all but the extending ends of the shaft 12. It is constructed from a series of ring-like plates clamped together. The pillow block includes end plates 16 and 16a, the end abutting plates 17 and 17a, the intermediate plates 18 and 18a, the center abutting plates 19 and 19a and the center plate 20. The end plates 16 and 16a, as well as the other pairs of plates, are mirror images of each other. Each of the plates are provided with transverse apertures adjacent their outer peripheries. There are six of these apertures equally spaced about the circumference of the plates, and are in transverse alignment. These apertures receive the tie bolts 55. The ends of the tie bolts 55 are threaded and receive nuts 56 which when tightened clamp the plates together forming the pillow block.

The centers of the center plate 20, the center abutting plates 19 and 19a and the intermediate plates 18 and 18a are bored out to form the drum opening 21. The drum opening 21 has a dimension slightly greater than the rotor drum 13 to allow fluid to flow between the members providing circumferential support as well as lubrication. This dimensional difference is termed the gap. It is also apparent from viewing FIG. 1 that the combined thicknesses or the transverse dimension of these members is somewhat greater than the length of rotor drum 13. This provides for a gap between the end abutting plates 17 and 17a, and for a cushion of fluid which controls axial movement of the rotor with respect to the pillow block. The end plates 16 and 16a and the end abutting plates 17 and 17a have their center portions removed to form the shaft opening 22. Again, the shaft opening 22 is of a slightly greater dimension than the shaft 12 to provide a gap for fluid support.

A fluid radially directed feed passage 23 (FIG. 1) is formed in the center plate 20. It extends radially inward to a point approximately half the radial dimension of the center plate. A hose or line coupling 24 is threaded to the center plate and communicates with the feed passage 23. The coupling 24 is connected by appropriate tubing to a conventional fluid supply (not shown). The plenum manifold 25 is formed transversely across the center plate 20 and communicates with the feed passage 23. The plenum manifold 25 also passes through the center abutting plates 19 and 19a as best shown in FIG. 1. The manifold 25 interconnects the annular plenum chambers 26, 27, 28 and 29. As shown in FIG. 2, there may be several manifolds 25 positioned at equally spaced intervals about the circumference of the pillow block to facilitate equal pressure distribution. Directed radially inwardly from the annular plenum chambers 26, 27, 28 and 29 are respectively gas slits 30, 31, 32 and 33. These gas slits open into the gap formed between the rotor 11 and the pillow block 15.

The reason for constructing the pillow block from a series of plates now becomes apparent. A portion of each of the intermediate plates, center abutting plates and the center plate are removed to form the gas slits, as well as the plenum chambers. This can be done by a rather simple machining operation before the plates are assembled. Similarly, it is a simple matter to provide the plates with the manifolding 25. The thickness of the plates can be varied to provide the desired position of the gas slits along the length dimension of the rotor drum 13. The spacing of the gas slits as shown in FIG. 1 has been found to provide a proper fluid distribution, however, it is to be understood that it may not be optimum, any variation of the spacing being deemed within scope of the invention.

Axial plenum chambers 35 and 41 are formed respectively in the end plates 16, 16a and abutting end plates 17 and 17a. These plenum chambers are also annular and are located so as to be within the radial dimension of the rotor drum 13. Radial supply passages 36 and 42 are connected with the respective plenum chambers 35 and 41 and are in turn connected to supply line couplings 37 and 43. The couplings are utilized to form a connection between a conventional fluid supply (not shown). Gas slits or orifices 38 and 44 are formed transversely through the end abutting plates 17 and 17a respectively. These gas openings 38 and 44 communicate with the axial plenum chambers 35 and 41 respectively, and with the gap formed between the ends of the rotor drum 13 and the end abutting plates 17 and 17a. Annular pressure pads 39 and 45 (FIG. 1), which are merely superimposed upon annular countersunk portions, may be superimposed upon the openings 38 and 44 to increase the load carrying capacity of the bearing assembly.

As stated above, the openings 38 and 44 may be slits or orifices. The latter form of opening will operate satisfactorily to restrain axial thrust; however, a slit type opening is preferable. If a slit type opening is utilized (FIG. 4) the lower portions of the end abutting plates which surround the rotor shaft 12 must be secured to the end plates 16 and 16a. This may be accomplished by a machine screw, spot welding or any conventional fastening means.

Exhaust collector rings 48 and 50 are formed in the end abutting plates 17 and 17a at the ends and adjacent the outer periphery of the rotor drum 13. These collector rings are annular in configuration and communicate with exhaust orifices 49 and 51 which are formed radially outwardly in the end abutting plates 17 and 17a respectively. It should be understood that the exhaust orifices 49 and 51 may be directed transversely through the end plates 16 and 16a. There are several of the exhaust orifices 49 and 51 as illustrated in FIG. 3 to facilitate rapid dissipation of the exhaust gas to the atmosphere or a collecting chamber as the situation demands.

From the above description the operation of the slit regulated gas journal bearing becomes apparent. Fluid from an appropriate supply source enters the coupling 24, passes through the feed passages 23 and manifolds 25 to the plenum chambers 26, 27, 28 and 29. The fluid then travels through the gas slits 30, 31, 32 and 33, and is discharged against the rotor drum 13. The fluid is forced to move in a direction normal to the gas slits providing a continuous flow of fluid between the surface of the rotor drum 13 and the rotor drum opening 21 formed in the pillow block 15. The fluid moves along the surface of the rotor drum 13 and is collected by the exhaust collectors 48 and 50, and directed to the outside of the pillow block by the exhaust orifices 49 and 51. Although not shown, it is to be understood that within the broadest aspect of the invention, the slit regulated gas journal bearing may be utilized with a closed fluid system. With this arrangement the bearing assembly would be mounted inside a collecting chamber. The exhaust fluid would then be collected and pass through appropriate apparatus whereby the fluid could be reused. The above described operation of the fluid resists and controls the radial movement of the rotor with respect to the pillow block.

The fluid directed through the couplings 37 and 43, supply passages 36 and 42, the axial plenum chambers 35 and 41 and the gas openings 38 and 44 regulate the axial movement of the rotor with respect to the pillow block. The fluid emitted from the openings 38 and 44 travels along the ends of the rotor drum 13 and escapes via the clearance between the rotor shaft 12 and the shaft opening 22 formed in the pillow block. The fluid may also be exhausted from the exhaust collector rings 48, 50 and their associated exhaust orifices.

The above described invention provides a device which develops a minimum of turbine torque. Since a continuous circumferential flow of fluid is emitted from the gas slits the factors normally causing turbine torque in an orifice regulated gas journal bearing are eliminated. The bearing of this invention is easier to make than the orifice type. It is rather a simple matter to machine or otherwise work away a portion of the annular plates which when clamped together form the gas slits. In the orifice type bearing the radial alignment of the orifice must be precise to prevent the possibility of turbine torque. It is also difficult to maintain equal hole size or concentricity as well as maintaining the proper circumferential spacing. The gas consumption of the slit regulated gas journal bearing is less than that of the orifice type. The consumption is less since there is a greater fluid resistance for a given area. The bearing of this invention is also superior in performance. The stiffness which is a function of the change in gap to the change of load or weight, expressed as $$s = \frac{\Delta h \text{ (height or gap)}}{\Delta w \text{ (weight or load)}}$$

is greater in a slit regulated gas journal bearing than in the orifice type. This means that for a given load there will be less deviation of the rotor from a desired true concentric position with respect to the pillow block. Also any dirt which may be carried by the fluid will not, as a rule, have the adverse affect upon the slit type bearing that it might upon an orifice type bearing. If a dirt particle should obstruct one of the orifices in an orifice type bearing there is a segment of some size about the circumference of the rotor from which fluid emission is eliminated. This immediately leads to unbalance in the fluid distribution resulting in turbine torque and eccentricity of the rotor. The bearing of this invention has been found to be quite successful, for example, for supporting the gimbal axis of gyros and accelerometers in inertial guiding systems. Since gyros and accelerometers are precision instruments the bearing with the advantages of the instant invention is believed to provide a true contribution to the state of the art.

Obviously, many modifications and variations of the present invention are possible in the light of the above teachings. It is, therefore, to be understood that within the scope of the appended claims the invention may be practiced otherwise than specifically described herein.

What is claimed is:

1. A gas journal bearing comprising: a pillow block, a rotor having an enlarged body portion journalled in said pillow block; first gas slits communicating with said rotor formed in said pillow block and surrounding said rotor body, second gas slits communicating with the ends of said rotor body; exhaust passages formed in said pillow blocks at the ends of said rotor body; plenum chambers for supplying fluid to said gas slits; manifold means for interconnecting said plenum chambers of said first gas slits; and means for supplying fluid to said manifold means and to said plenum chambers of said second gas slits.

2. A gas journal bearing as in claim 1 wherein said pillow block is constructed from a number of plates connected together by tie bolts, portions of the sides of plates being worked away and when joined together forming certain of said gas slits.

References Cited in the file of this patent

UNITED STATES PATENTS

| | | |
|---|---|---|
| 1,629,577 | Klahn | May 24, 1927 |
| 2,671,700 | Seyffert | Mar. 9, 1954 |
| 3,026,150 | Buckley et al. | Mar. 20, 1962 |

FOREIGN PATENTS

| | | |
|---|---|---|
| 688,152 | Great Britain | Feb. 25, 1953 |